(12) United States Patent
Charraud et al.

(10) Patent No.: US 11,527,038 B2
(45) Date of Patent: Dec. 13, 2022

(54) AUGMENTED REALITY SMART DRAWER SYSTEM AND METHOD

(71) Applicant: L'OREAL, Paris (FR)

(72) Inventors: Gregoire Charraud, Levallois-Perret (FR); Tiffany James, Paris (FR); Edouard Messager, St-Ouen (FR); Geraldine Thiebaut, Asnieres sur Seine (FR); Helga Malaprade, Vincennes (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/355,622

(22) Filed: Jun. 23, 2021

(65) Prior Publication Data
US 2021/0407181 A1    Dec. 30, 2021

Related U.S. Application Data

(60) Provisional application No. 63/046,199, filed on Jun. 30, 2020.

(51) Int. Cl.
*G06T 15/20*    (2011.01)
*G06T 7/50*    (2017.01)
(Continued)

(52) U.S. Cl.
CPC ........ *G06T 15/205* (2013.01); *G06F 16/9017* (2019.01); *G06T 7/0002* (2013.01);
(Continued)

(58) Field of Classification Search
CPC ....... G06T 15/205; G06T 7/0002; G06T 7/50; G06T 19/006; G06T 19/20;
(Continued)

(56) References Cited

U.S. PATENT DOCUMENTS 10,002,337 B2    6/2018    Siddique et al.
2012/0175412 A1    7/2012    Grabiner et al.
(Continued)

FOREIGN PATENT DOCUMENTS

KR    10-1864989 B1    6/2018

OTHER PUBLICATIONS

International Search Report and Written Opinion dated Oct. 15, 2021 in PCT/IB2021/000425, 15 pages.

*Primary Examiner* — Chong Wu
(74) *Attorney, Agent, or Firm* — Oblon, McClelland, Maier & Neustadt, L.L.P.

(57) ABSTRACT

Disclosed is a mobile apparatus for monitoring state of cosmetic items in a drawer or on a shelf. The apparatus includes a camera; a display device; and processing circuitry. The processing circuitry is configured to capture an image of the drawer and its contents using the camera, decode the captured image to identify the cosmetic items contained in the drawer and respective location of the identified cosmetic items, and display on the display device a notification of identified cosmetic items that have expired. An augmented reality display device highlights a group of cosmetic items determined to be compatible and within a freshness degree. The processing circuitry is configured to display on the mobile display a notification of a cosmetic item to apply, highlight the cosmetic item in the augmented reality display device, and record in a database usage information of the cosmetic item.

20 Claims, 7 Drawing Sheets

(51) Int. Cl.
*G06F 16/901* (2019.01)
*G06T 7/00* (2017.01)
*G06T 19/00* (2011.01)
*G06T 19/20* (2011.01)

(52) U.S. Cl.
CPC .............. *G06T 7/50* (2017.01); *G06T 19/006* (2013.01); *G06T 19/20* (2013.01); *G06T 2215/16* (2013.01); *G06T 2219/2016* (2013.01)

(58) Field of Classification Search
CPC ......... G06T 2215/16; G06T 2219/2016; G06F 16/9017; G06V 30/10; G06V 20/20; G06V 10/75; G06K 9/6201; G06Q 30/0631; G06Q 50/28; G06Q 10/087
See application file for complete search history.

(56) References Cited

U.S. PATENT DOCUMENTS

| | | |
|---|---|---|
| 2012/0233070 A1 | 9/2012 | Calman et al. |
| 2016/0364788 A1* | 12/2016 | Jo .......................... G06V 20/62 |
| 2018/0075523 A1* | 3/2018 | Sartori Odizzio . G06Q 30/0643 |
| 2019/0244436 A1 | 8/2019 | Stansell et al. |
| 2020/0226545 A1* | 7/2020 | Reid ................... G06V 10/235 |

* cited by examiner

AUGMENTED REALITY SMART DRAWER SYSTEM AND METHOD

CROSS-REFERENCE TO RELATED APPLICATIONS

This application claims the benefit of priority to provisional application No. 63/046,199 filed Jun. 30, 2020 and French application Serial No. 2009479 filed Sep. 18, 2020, the entire contents of which are incorporated herein by reference.

TECHNICAL FIELD

The present disclosure is directed to an augmented reality smart drawer system and method. The system and method monitors a drawer for expired cosmetic products and compatibility of cosmetic products, and guides application of cosmetic products.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Furniture for use when applying cosmectics including cosmetic vanity desks and other drawer and/or shelf-containing furniture for placing cosmetic products may enable organizing the cosmetic products up to a point. Cosmetic products may be organized by being placed in one or more drawers or on one or more shelves by type of product or area of application, e.g., lips, eye treatment, face, nails. In many cases, a piece of furniture may be limited by the number of drawers and/or shelves and as a result all cosmetic products may be placed in one or two drawers in an intermixed fashion. In other cases, a furniture may have several drawers such that cosmetic products are spread out in the drawers and may even be mixed with non-cosmetic products, e.g., scissors, hair brush, cotton balls/swabs; office-related products, e.g., note pads, pens; as well as cosmetic removal products, e.g., nail polish removal, make-up removal.

Different cosmetic products may be purchased over time for various reasons. For purposes of this disclosure, the term cosmetic product and cosmetic item are used interchangeably, and each refer to a range of products that are used to care for the face and body or to enhance or change the appearance of the face or body. Replacement cosmetic products may be purchased when a particular product has run out or is close to being empty. New cosmetic products may be purchased because of an interest in a new color, new product type, or for a new area of the body to apply cosmetics. Subsequently, new cosmetic products may be purchased even when a similar product has been previously purchased.

Some cosmetic products that may not have been used for a long time or are rarely used, may have expired, or may be stored in a drawer with other unrelated products. Such disorganization can lead to difficulty in locating desired cosmetic products, rarely-used products being mixed in with more frequently used products, and a lack of realization that empty or near empty cosmetic products need to be replenished. Time spent searching and time taken in applying cosmetics in an inconsistent manner may be excessive, in some cases to a point that some cosmetics are not applied while others are hastily applied.

SUMMARY

An aspect is a mobile apparatus for monitoring state of cosmetic items in a drawer or on a shelf. The apparatus including a camera; a display device; and processing circuitry. The processing circuitry is configured to capture an image of the drawer and its contents using the camera, decode the captured image to identify the cosmetic items contained in the drawer and respective location of the identified cosmetic items, and display on the display device a notification of identified cosmetic items that have expired.

An aspect is an augmented reality system for indicating status of cosmetic items in a drawer or on a shelf. The system including a mobile device having a mobile display, a camera, and processing circuitry; and an augmented reality display device. The processing circuitry is configured to capture an image of a drawer and its contents, recognize cosmetic items contained in the drawer, analyze the recognized cosmetic items for compatibility and freshness degree, and the augmented reality display device highlighting a group of cosmetic items determined to be compatible and within the freshness degree.

An aspect is an augmented reality system for guiding application of cosmetic items in a drawer or on a shelf. The system including a mobile device having a mobile display, a camera, and processing circuitry; and an augmented reality display device. The processing circuitry is configured to display on the mobile display a notification of a cosmetic item to apply, highlight the cosmetic item in the augmented reality display device, and record in a database usage information of the cosmetic item.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views.

Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to an augmented reality system and method for tracking cosmetic products with a smart drawer mobile application. An aspect is a method of tracking an inventory of cosmetic products in the smart drawer mobile application. An aspect is a method of providing guidance in applying cosmetic products to a user using the smart drawer mobile application. An aspect is a smart drawer mobile application configured to identify compatible cosmetic products.

Figures 1A, 1B:
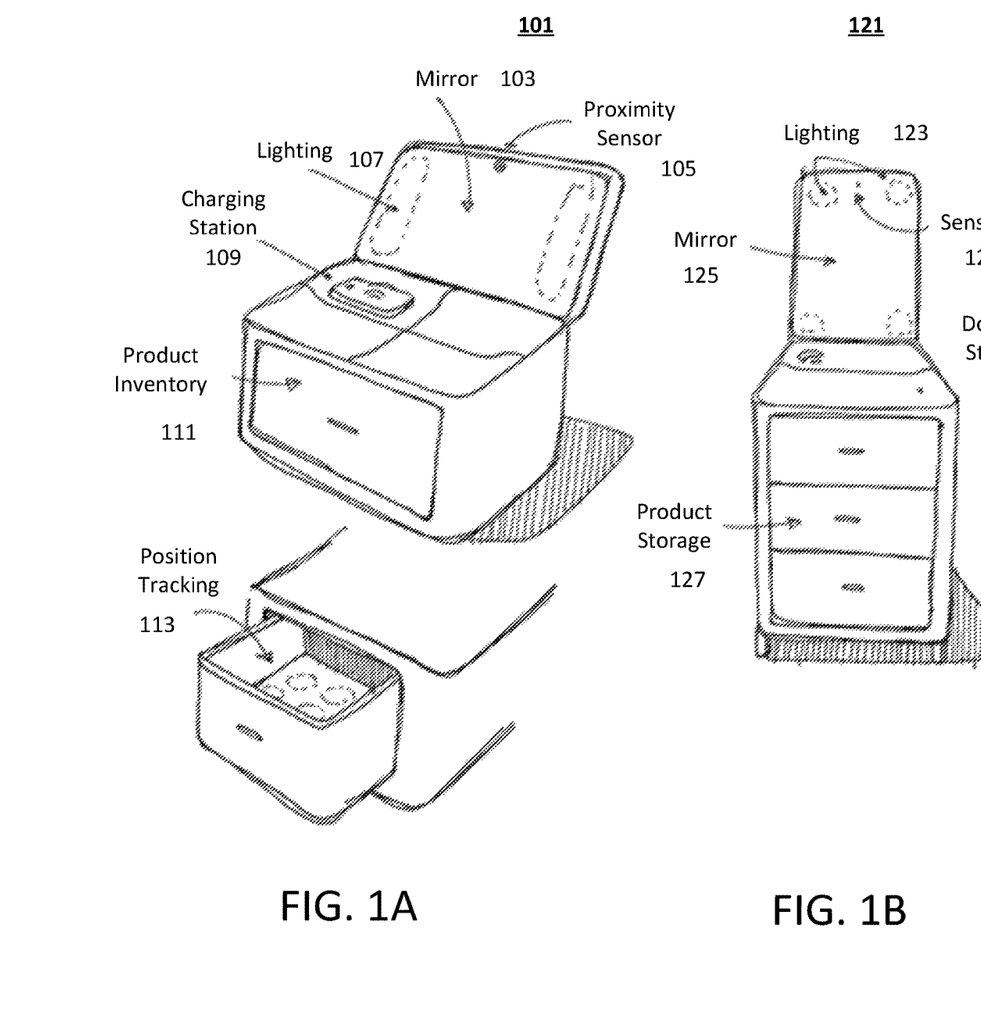
FIGS. 1A, 1B, 1C are schematic diagrams of smart cosmetic drawer appliances in according to an exemplary aspect of the disclosure.
Figure 1C:
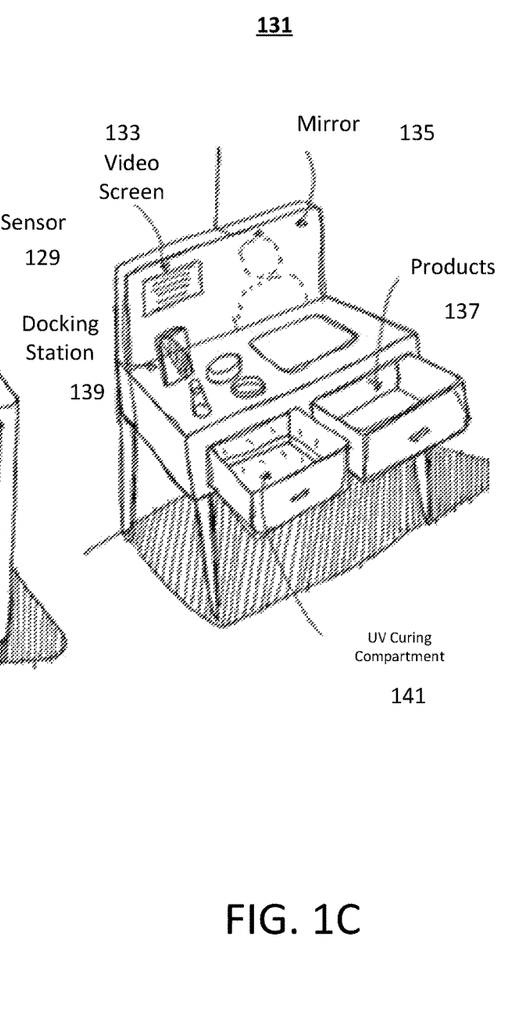

FIGS. 1A, 1B, 1C are schematic diagrams of cosmetic furniture according to an exemplary aspect of the disclosure. Conventional furniture for keeping cosmetic products may contain one or more drawers and/or shelves, at least one mirror, and in some cases built-in lighting. A high end cosmetic furniture may include a UV curing compartment. However, conventional cosmetic furniture typically leaves it up to a user to decide where to place various cosmetic items. Cosmetic items may be placed in an organized fashion or may be placed in a random fashion. Even an organized arrangement of cosmetic products is not without problems. Some cosmetic items may be near empty or completely empty, but a subject user may not realize the low remaining quantity of the cosmetic item until the cosmetic item is needed. A subject user may not realize that some cosmetic items may have expired, or may be close to being expired. A subject user may still waste time by randomly or inconsistently applying cosmetic items to themselves.

Regarding FIG. 1A, a cosmetic furniture 101 may include a drawer 111 configured for tracking product position 113 and inventory. The drawer 111 may be box-shaped with an open top for accessing the drawer. The drawer 111 typically includes a handle or indentation on an exterior panel for pulling the drawer out of its closed position in order to expose the open top. The exterior panel may be substantially flush with the cosmetic furniture 101 in the closed position. An inner bottom surface of the drawer 111 may be flat, may contain an inner lining material, may contain divider walls for dividing the drawer into compartments. The drawer 111 may contain stackable and/or removable boxes.

The cosmetic furniture 101 may include a proximity sensor 105 that may detect when a user is proximate to the cosmetic furniture 101. The proximity sensor 105 may be positioned anywhere along a periphery of a mirror 103, such as centered above the mirror 103. The proximity sensor 105 may be included in a user-facing surface of the cosmetic furniture 101 along the periphery of the drawer exterior panel, such as centered above the drawer exterior panel.

The cosmetic furniture 101 may include built-in lighting 107 and a mirror 103. The built-in lighting 107 may include one or more conventional incandescent bulbs, fluorescent lighting, or LED lighting. The built-in lighting 107 may be along one or more side edges of the mirror 107.

The cosmetic furniture 101 may include an optional charging station 109 for providing power to rechargeable electronic devices. The charging station 109 may be a battery power connection for charging an internal battery, or may be a USB connector for attaching a USB cable or USB device. The USB connector may be a type that is configured for data transfer as well as power transfer. The charging station 109 may be a contactless charging station for charging a smartphone, touch pad, tablet, or other mobile device.

Regarding FIG. 1B, a cosmetic furniture 121 may include multiple drawers 127, at least one of the drawers including position tracking and inventory management. The drawers 127 may be identical in size or may be of two or more different sizes. The different size drawers 127 may be of same width and depth, but of different height. The different size drawers 127 may be of different widths and heights, with same depths. Similar to FIG. 1B, the cosmetic furniture 121 may include built-in lighting 123 and a mirror 125. The cosmetic furniture 121 may include a proximity sensor 129 that may detect when a subject user is proximate to the furniture 101.

Regarding FIG. 1C, a cosmetic furniture 131 may be a cosmetic vanity desk. The cosmetic furniture 131 may include a built-in video screen 133, a mirror 135, and a docking station 139. The built-in video screen 133 may include a display screen and an audio output speaker or just a video display screen. The mirror 135 may include built-in lighting. The docking station 139 may include a data and/or power interface for a portable device. The cosmetic furniture 131 may include one or more drawers 137. The drawers 137 may be the same or different sizes. A drawer 137 may be configured to track position and inventory of cosmetic products. Another specialized drawer may have a UV curing compartment 141 to store items that require sanitizing, such as combs, brushes, scissors and other items that are used to apply cosmetics. The built-in video screen 133 may provide guidance on the steps in applying cosmetic products.

Figure 2:
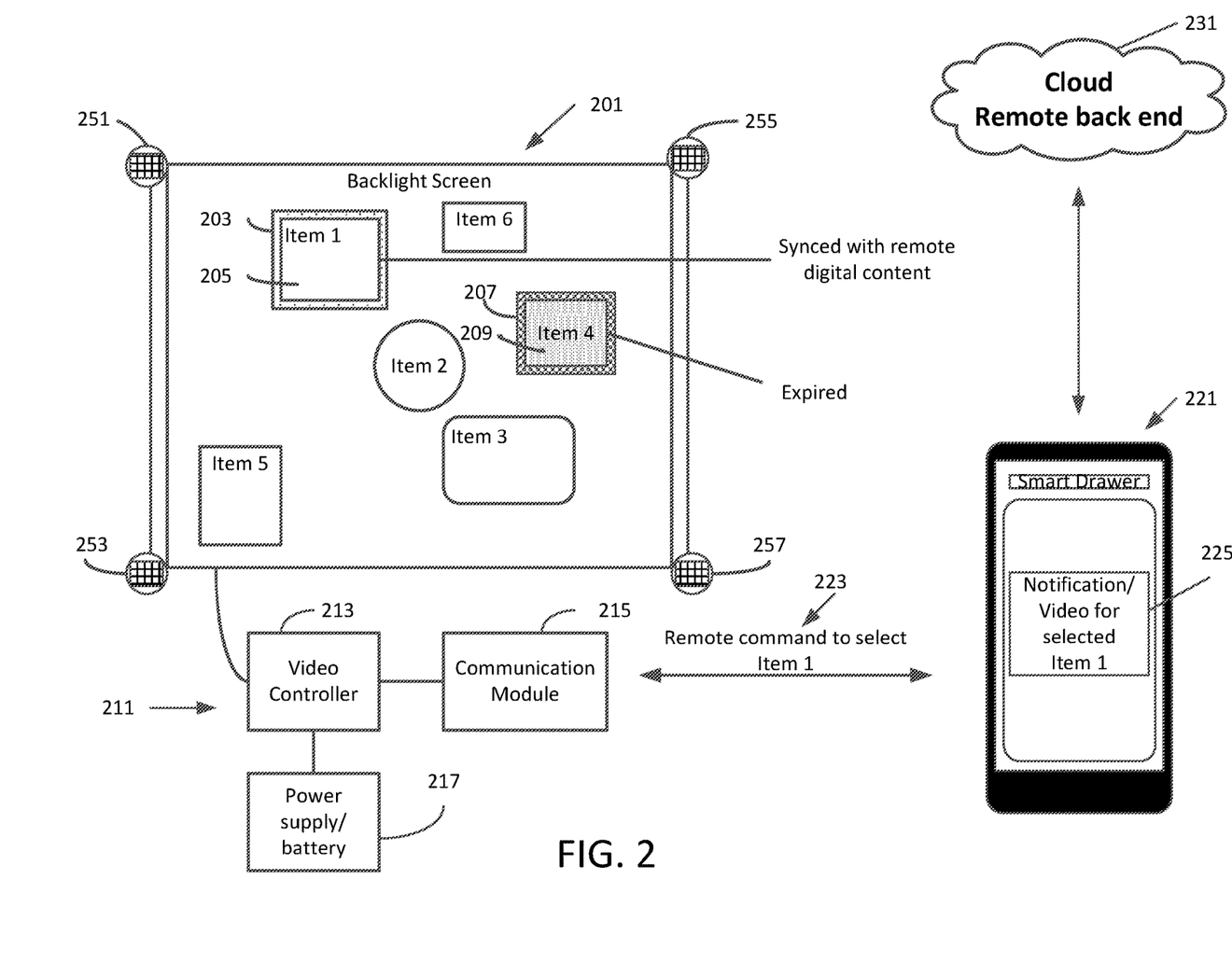
FIG. 2 is a block diagram of an augmented reality system for cosmetic products in accordance with an exemplary aspect of the disclosure.

FIG. 2 is a block diagram of an augmented reality system for interacting with cosmetic items in accordance with an exemplary aspect of the disclosure. Cosmetic items contained in a physical drawer 111, 127, 137 may be displayed as an augmented camera image on a display screen 201.The display screen 201 may be a built-in video screen 133 or may be a separate display device, such as a tablet or other portable display device. The camera image of a physical drawer may be augmented with backlight-type highlighting in order to indicate special status information of a cosmetic item. Highlighting of a cosmetic item, such as item 1 (203), using a certain color in the border of the item, such as green 205, may be used to indicate that the item 1 has been synchronized with a remote device 221, such as being selected with a command received from the mobile device 215 in order to remotely display status content 225 of the selected cosmetic item 1, Highlighting of an item, such as item 4 (207), using a certain color in the border of the item, such as red 209, may be used to indicate an alert that the item 4 is expired, or is about to expire. In one or more embodiments, the highlighting of an item may be performed by periodically flashing the backlight in the border of the item.

The augmented display for the display screen 201 may be performed using display circuitry 211 that includes a video controller 213, a communication module 215, and a power supply or battery 217. The communication module 215 may be configured to establish and conduct communications with a mobile device 221. The communication module 215 may be configured to conduct communications using Bluetooth, Bluetooth Low Energy, WiFi, or a cellular protocol, to name a few.

A mobile device 221 may include a mobile application, also referred to as an App, that communicates with the display circuitry 211, provides notifications and guidance to a subject user, and performs processing operations on images obtained using a camera of the mobile device 221. In one or more embodiments, the mobile device 221 may utilize services of a cloud service 231 to perform some of the processing operations.

Figure 3:
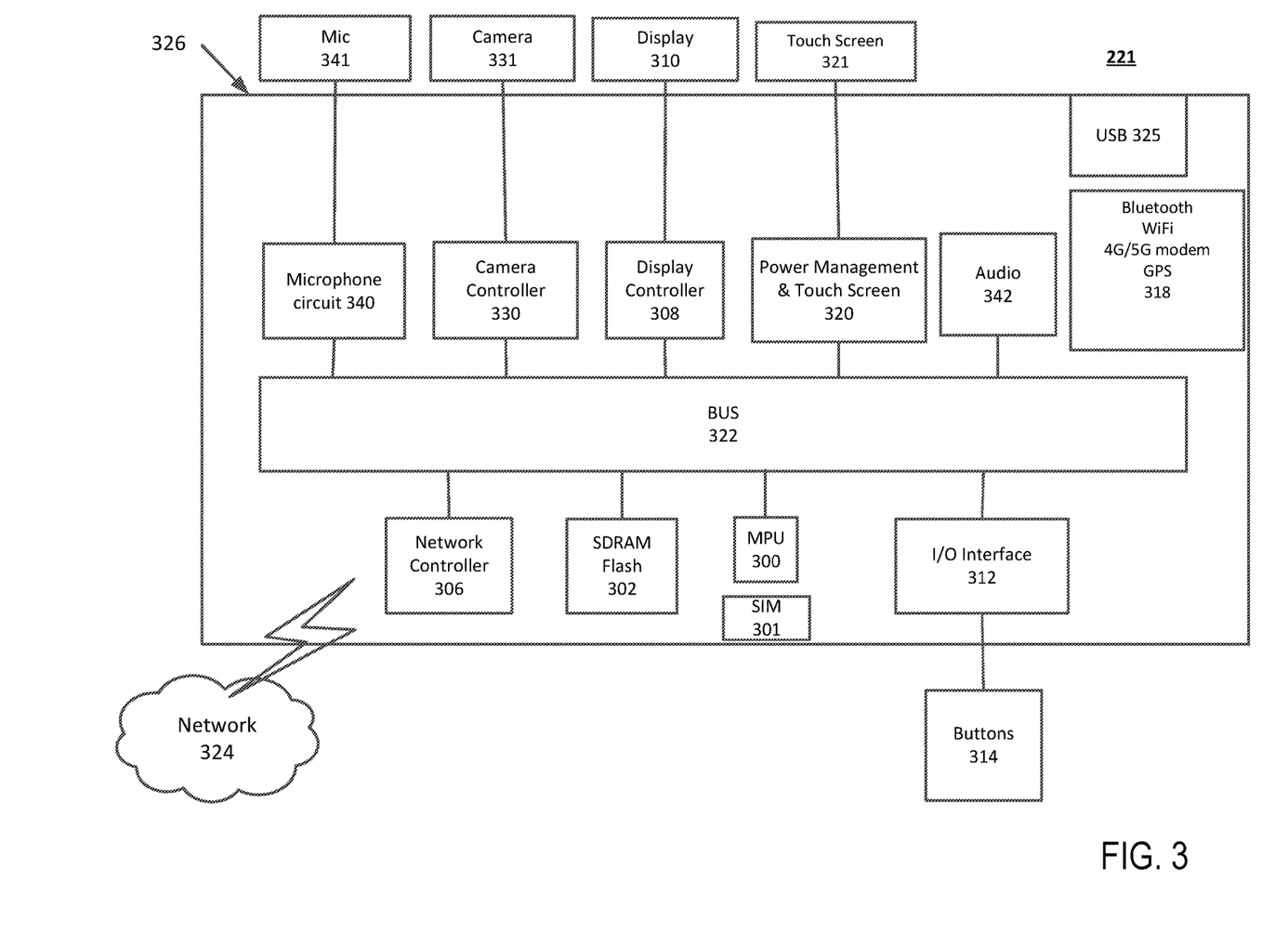
FIG. 3 is a block diagram of a mobile device.

In one implementation, the functions and processing operations of the mobile device 221 may be implemented by one or more respective processing circuits 326. A processing circuit includes a programmed processor as a processor includes circuitry. A processing circuit may also include devices such as an application specific integrated circuit (ASIC) and conventional circuit components arranged to perform the recited functions. Note that circuitry refers to a circuit or system of circuits. Herein, the circuitry may be in one computer system (as illustrated in FIG. 3) or may be distributed throughout a network of computer systems. Hence, the circuitry of a server computer system or example may be in only one server or distributed among different servers/computers.

Next, a hardware description of the processing circuit 326 according to exemplary embodiments is described with reference to FIG. 3. In FIG. 3, the processing circuit 326 includes a Mobile Processing Unit (MPU) 300 which performs the processing operations described herein. The process data and instructions may be stored in memory 302. These process data and instructions may also be stored on a portable storage medium or may be stored remotely. The processing circuit 326 may have a replaceable Subscriber Identity Module (SIM) 301 that contains information that is unique to the network service of the mobile device 221.

Further, the disclosed embodiments are not limited by the form of the computer-readable media on which the instructions are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 326 communicates, such as a server or computer.

Further, the disclosed embodiments may be provided as a utility application, background daemon, or component of an operating system, or combination thereof, executing in conjunction with MPU 300 and a mobile operating system such as Android, Microsoft® Windows® 10 Mobile, Apple iOS® and other systems known to those skilled in the art.

In order to achieve the processing circuit 326, the hardware elements may be realized by various processing circuitry elements, known to those skilled in the art. For example, MPU 300 may be a Qualcomm mobile processor, a Nvidia mobile processor, a Atom® processor from Intel Corporation of America, a Samsung mobile processor, or a Apple A7 mobile processor, or may be other processor types that would be recognized by one of ordinary skill in the art. Alternatively, the MPU 300 may be implemented on an Field-Programmable Gate Array (FPGA), Application Specific Integrated Circuit (ASIC), Programmable Logic Device (PLD) or using discrete logic circuits, as one of ordinary skill in the art would recognize. Further, MPU 300 may be implemented as multiple processors cooperatively working in parallel to perform the instructions of the inventive processes described above.

The processing circuit 326 in FIG. 3 also includes a network controller 306, such as an Intel Ethernet PRO network interface card from Intel Corporation of America, for interfacing with a network 324. In disclosed embodiments, the network 324 includes access to a cloud service 231. As can be appreciated, the network 324 can be a public network, such as the Internet, or a private network such as LAN or WAN network, or any combination thereof and can also include PSTN or ISDN sub-networks. The network 324 can also be wired, such as an Ethernet network. The processing circuit may include various types of communications processors for wireless communications including 3G, 4G and 5G wireless modems, WiFi®, Bluetooth®, GPS, or any other wireless form of communication that is known.

The processing circuit 326 includes a Universal Serial Bus (USB) controller 325 which may be managed by the MPU 300.

The processing circuit 326 further includes a display controller 308, such as a NVIDIA® GeForce® GTX or Quadro® graphics adaptor from NVIDIA Corporation of America for interfacing with display 310. An I/O interface 312 interfaces with buttons 314, such as for volume control. In addition to the I/O interface 312 and the display 310, the processing circuit 326 may further include a microphone 341 and one or more cameras 331. The microphone 341 may have associated circuitry 340 for processing the sound into digital signals. Similarly, the camera 331 may include a camera controller 330 for controlling image capture operation of the camera 331. In an exemplary aspect, the camera 331 may include a Charge Coupled Device (CCD). The processing circuit 326 may include an audio circuit 342 for generating sound output signals, and may include an optional sound output port.

The power management and touch screen controller 320 manages power used by the processing circuit 326 and touch control. The communication bus 322, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 326. A description of the general features and functionality of the display 310, buttons 314, as well as the display controller 308, power management controller 320, network controller 306, and I/O interface 312 is omitted herein for brevity as these features are known.

Figure 4:
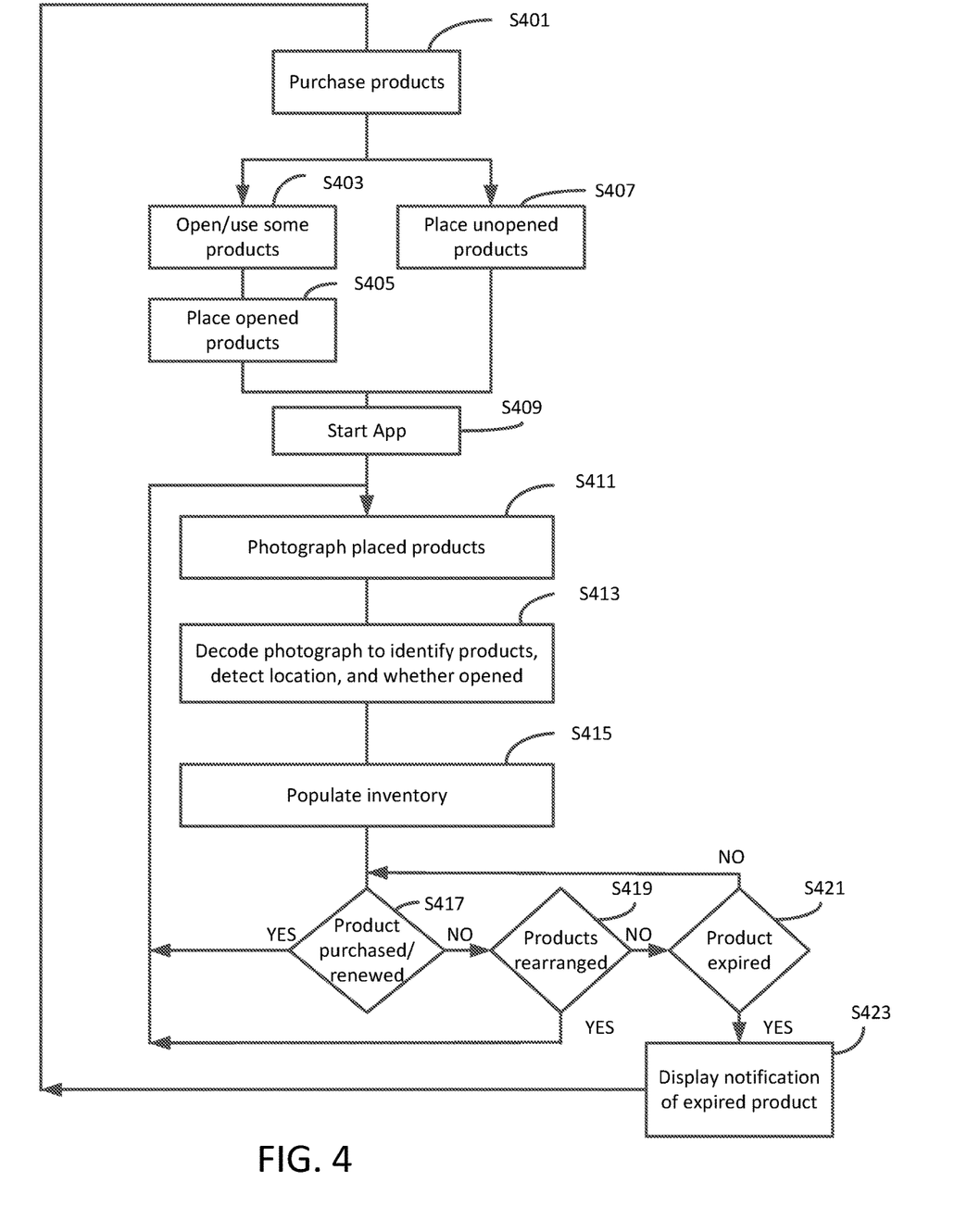
FIG. 4 is a flowchart for cosmetic product inventory in accordance with an exemplary aspect of the disclosure.

FIG. 4 is a flowchart for cosmetic product inventory in accordance with an exemplary aspect of the disclosure. New cosmetic products may be purchased, S401. The new cosmetic products may be applied to a subject user, in S403, and/or placed, in S405 or S407, into at least one drawer 111, 127, 137.

In one or more embodiments, in step S409 a subject user may activate the mobile device application (App) when new cosmetic products are purchased, when cosmetic items are to be moved, or simply to check the status of cosmetic items stored in a cosmetic furniture. Upon activation of the App, the App may first display a reminder to the subject user that if any changes have been made to contents of drawers, a photograph should be taken of the at least one drawer and/or shelf in order to ensure that the App has the last status information of the cosmetics. As an alternative to a reminder, the App may present a display that asks the subject user whether changes have been made to any of the cosmetic items, such as movement of an item or items, placement of a new item or items, usage of an item or items, or removal of an item or items. The App may present a message instructing a subject user to take a photograph of a drawer(s) and/or shelf (shelves) containing cosmetics in order to confirm whether any changes have been made since a last photograph(s) was taken.

In one or more embodiments, at least one photograph of a new cosmetic product may be taken before the new cosmetic product is placed in the drawer. The photograph of the new cosmetic product may be taken in order to obtain information about the product, including an initial purchase date, expiration date, quantity of the product. If an expiration date is not shown in the product container, an expiration date may be estimated based on the purchase date. If there are no dates shown on the product container, the purchase date may be an initial product date that the product is first placed in a drawer. Also, a photograph of a new cosmetic product may be used to aid in identifying the product when it is in a drawer.

Upon being placed into a drawer 111, 127, 137, in S411, a camera 331 of the mobile device 221 may be used to capture an image of a top view of the opened drawer. In one or more embodiments, several images of the drawer contents may be taken from different angles in an effort to obtain product information for each cosmetic item in the drawer. In one or more embodiments, a video of the opened drawer may be captured using a video function of the mobile device 221. The mobile device 221 may be configured with a calibration process, in which the camera controller 330 detects the four, top or bottom, corners of a drawer. One corner 253 may serve as a reference that the display screen 201 uses to align with a corner of the display. One corner 251 may serve as an error control code. One corner 255 may serve as a marker for the length dimension of the drawer. One corner 257 may serve as the width dimension of the drawer. The camera controller 330 may adjust the zoom of the camera 331 to obtain an image of the drawer that is a size of the display screen 201. The display circuitry 211 may align the camera image with the display screen 201 using the code associated with the corners. The corners may also serve as reference coordinates for determining coordinates of cosmetic item position.

In one or more embodiments, a picture of the new cosmetic product, or at least its label, may be taken using the camera 331 before the cosmetic product is placed in the drawer. The mobile device 221 may identify the cosmetic product using the image of the product or product label, or the mobile device 221 may forward the product image to the cloud service 231 to identify the cosmetic product. The image of the product may be subject to image processing to extract features such as shape of the product and color of the product. The image of the product label may be subject to optical character recognition (OCR) and the resulting text information may be extracted.

In S413, the image of the top view of the drawer may be decoded to identify cosmetic items in the drawer, detect location of the cosmetic items, as well as determine whether a cosmetic item has been previously opened and used. Cosmetic items may be recognized using image processing circuitry by extracting selected features from a given image and comparing the selected features with products within a database. In one or more embodiments, a database of cosmetic product images, image features, and associated product information is maintained in the cloud service 231.

Features of a cosmetic product stored in a database may include the three-dimensional shape of the container for the cosmetic product, dimensions of the three-dimensional shape of the container, location of a product label on the container (e.g., top, side), whether the container is transparent or not, a type of the container (e.g., Jar, Stick/Tube, Paste dispenser, Bottle, Spray Bottle, Bottle-Applicator combination, Metal(Tin) canister, Box, Pad, Pencil), and color.

Product information that may be maintained in the database may include a product identification number, a product name, a product category (including a broad cosmetic category: skin care, personal care, fragrance, or alternatively an area of the body—lips, face, eyelashes, eye area, nails; or specific category: lipstick, mascara, eye shadow, foundation, blush, highlighter, bronzer). The database may also contain information about product applicators, such as brushes and pads.

In S415, in addition to information for identifying cosmetic products, a database may be maintained containing a status of each cosmetic product. The status information may include the quantity of a cosmetic product. There may be more than one of the cosmetic product Each cosmetic item may include an initial product placement/storage date (date that a product is first placed in a drawer), an expiration date, and relative location coordinates in a drawer, and an identification of the drawer.

In one or more embodiments, a drawer 111, 127, 137 may be configured with a motion detector to detect movement of items within the drawer, placement or removal of a cosmetic item in the drawer, or simply opening of a drawer. In the case that an event is detected using the motion detector, a message may be displayed on a screen of the mobile device 221.The message may be a notification message that a change may have occurred in the inventory. The message may further recommend that one or more pictures should be taken of the drawer contents.

In the case that a motion detector detects placement of a cosmetic item into a drawer, the mobile device 221 may be configured to determine, in S413, using captured images, in S411, whether a product has been purchased or renewed (S417). In the case that a motion detector detects movement of cosmetic items in a drawer, the mobile device 221 may be configured to determine, in S413, using captured images, in S411, whether cosmetic products in the drawer have been rearranged (S419).

Further, the mobile device 221 may detect that a product has expired, or is about to expire (S421) based on the expiration date, or based on an initial date of placement in a drawer. In the case that the mobile device 221 determines that cosmetic product has expired, or is about to expire, in S423, the mobile device 221 may display a notification message of the expired cosmetic product.

Figure 5:
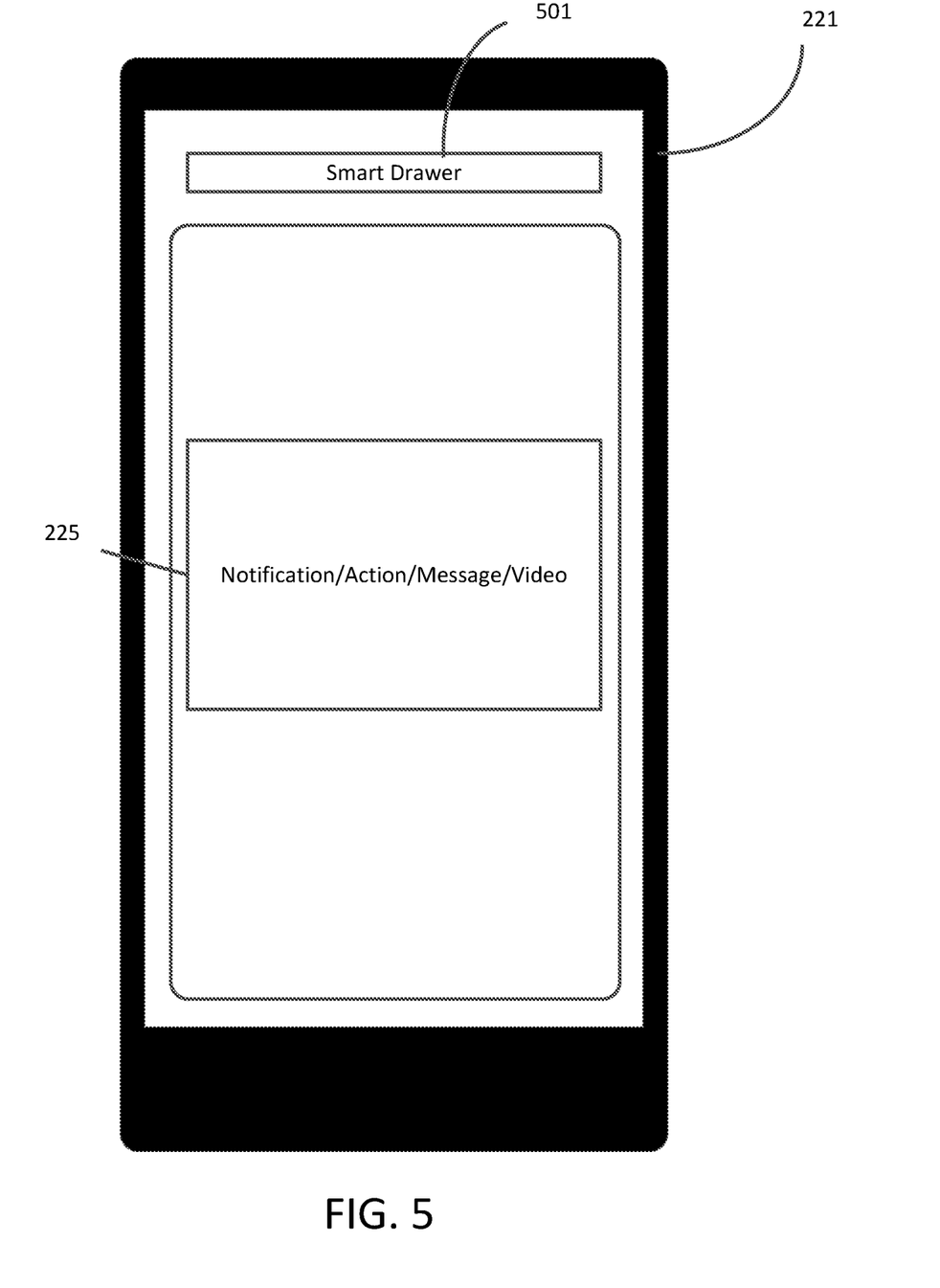
FIG. 5 is a display screen of a mobile device in accordance with an exemplary aspect of the disclosure.

FIG. 5 is a display screen of a mobile device in accordance with an exemplary aspect of the disclosure. The mobile device 221 may be configured to display notification messages 225 as part of the smart drawer mobile application 501.The notification message 225 may be a text message, a combination of text and graphics, and/or video. The notification message 225 may include an action to be taken, such as a recommended replacement for an expired cosmetic item.

Figure 6:
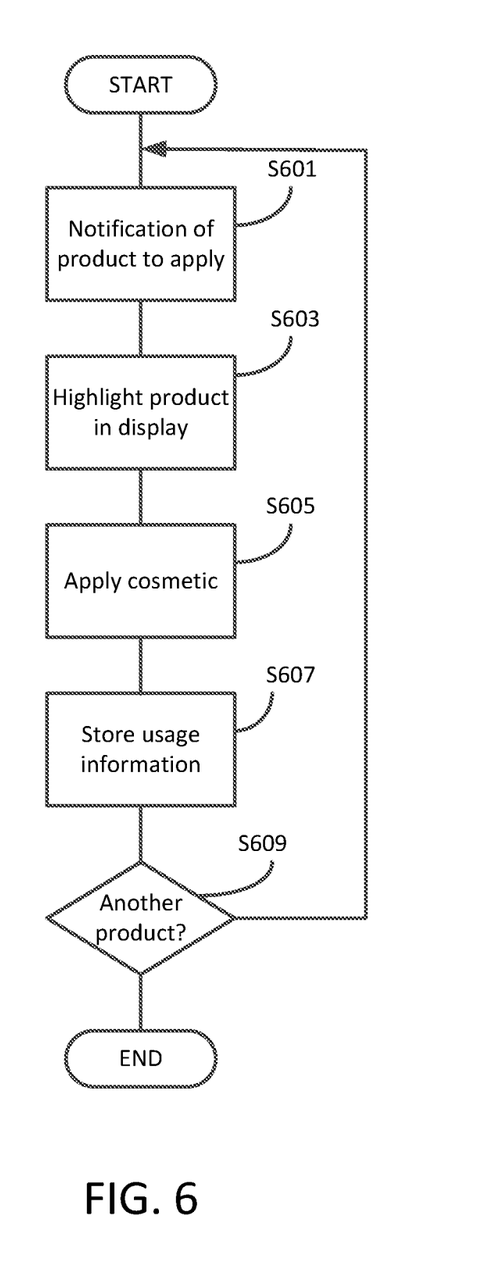
FIG. 6 is a flowchart of a method of guiding application of cosmetic products in accordance with an exemplary aspect of the disclosure.

FIG. 6 is a flowchart of a method of guiding application of cosmetic products in accordance with an exemplary aspect of the disclosure. Provided a known location of cosmetic items in a drawer 111, 137, or multiple drawers 127, the screen 201 may provide guidance on the location of cosmetic items in a sequence that is appropriate for a particular cosmetic application. A particular cosmetic application may include a particular area of the body, and whether the application is for purposes of care and cleansing, replenishing and protection, or to enhance appearance.

The mobile device 221 may display notification messages in a sequence for creating a makeup look based on cosmetic items. The display device 201 may display the location of each cosmetic item in the drawer 111, 137. Regarding FIG. 6, in S601, a notification message for a cosmetic item to apply next is displayed by the mobile device 221.

In S603, a display of a drawer 111, 127, 137 and its contents is displayed, augmented with a highlight around a border of a cosmetic item that is listed in the display of the mobile device 221 so that the item can be located in the drawer. An augmented display containing a highlight may be produced in the mobile device 221 by performing edge detection and object recognition. Once objects in an image are recognized, the border of selected objects may be made transparent for a predetermined pixel width. The image with transparent borders around certain objects may be superimposed with a backlight image of a certain color, or a solid white image. In one or more embodiments, the backlight image may be periodically displayed on and off in order to provide a flashing effect.

In one or more embodiments, a video captured by the mobile device 221 may undergo augmented reality processing to produce the backlight effect at borders of selected objects. Augmented reality software may be implemented in the mobile device 221, by MPU 300, or may be implemented in a cloud service 231. In one embodiment, the augmented reality software may use the ARCore software development kit available at Google. Images of various cosmetic products are stored in a cosmetic product database. It is preferred that the cosmetic product database be maintained in the cloud service 231 so that it may be updated for all users. The augmented reality software determines coordinates for the real world drawer or shelf being captured in the video. The augmented reality software then performs feature detection and may recognize objects based on detection of images stored in the cosmetic product database. Recognized objects in the scene may be assigned markers to track with the objects. In one or more embodiments, a subject user may select particular recognized objects for focus. The augmented reality software may also recognize text in the video using optical character recognition (OCR), and may use the recognized text for identification of the recognized objects as well as to provide other information about an object, such as a product name.

The augmented reality software can provide location information of objects, and together with identification information of recognized objects can retrieve product information from a local cosmetic product database for cosmetic items in a cosmetic furniture, such as an initial placement date, number of times used, other compatible products.

In S605, a subject user may apply the cosmetic item in a manner as instructed in the notification message. In S607, a record of the application of the cosmetic item may be stored in the database. In one or more embodiments, a cosmetic item may be characterized by an expected number of usages until it is exhausted. The mobile device 221 may keep track of the number and approximate quantity of usage of a cosmetic item so that the mobile device 221 may predict when the cosmetic item may need to be replaced or discarded. In S609, the mobile device 221 may determine if there is a next cosmetic item to be applied in accordance with the cosmetic application.

In one or more embodiments, the particular cosmetic applications may include cosmetic items that may be stored in reference to a personal profile. Also, the cosmetic items may be selected from those that are known in the database to be located in a drawer 111, 127, 137. If a cosmetic item that is referenced in a personal profile is missing or close to being empty, a notification message may be displayed on the mobile device 221 to indicate that the cosmetic item is needed to be purchased before the cosmetic application may be performed. In one or more embodiments, a particular cosmetic application may be for a cosmetic application template for a particular makeup look. For example, there may be a cosmetic application template for an actor makeup look profile.

Figure 7:
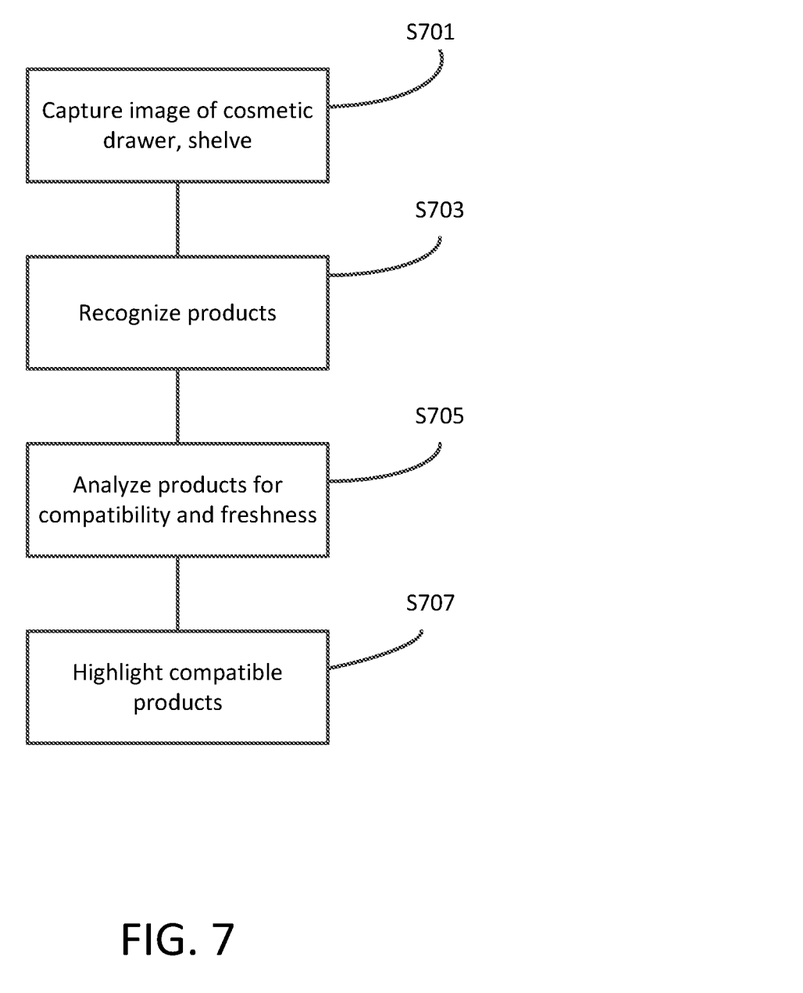
FIG. 7 is flowchart of a method of highlighting compatible cosmetic products in accordance with an exemplary aspect of the disclosure.

FIG. 7 is flowchart of a method of highlighting compatible cosmetic products in accordance with an exemplary aspect of the disclosure. In one or more embodiments, it may be useful to identify cosmetic items for a cosmetic application that are compatible with each other. Compatible cosmetic items in the context of a cosmetic application may be defined as cosmetic items that are of compatible colors or that are composed of compatible chemicals. In one or more embodiments, compatible cosmetic items may be those that are compatible with cosmetic items used for other areas of the body. For example, cosmetic items used for lips may need to be compatible with cosmetic items used for eyes.

Regarding FIG. 7, in S701, the mobile device 221 may be used to capture an image or video of an opened drawer and/or shelf containing cosmetic items, and in S703, circuitry in the mobile device 221 or the cloud service 231 may perform recognition of one or more cosmetic items in the drawer and/or shelf. In S705, analysis may be performed to determine compatibility and freshness of the recognized cosmetic items. In one or more embodiments, compatibility of cosmetic items may be determined using a look-up table containing a predetermined matrix that relates compatible cosmetic items. The look-up table may be stored in the mobile device 221 or in the cloud service 231. Freshness of cosmetic items may be determined using dates stored in the database, where dates that are within a predetermined time duration are considered as having a similar freshness. In S707, an augmented display of the drawer and/or shelf may be displayed in the display screen 211 that highlights compatible products with same colors.

The above disclosure also encompasses the embodiments listed below.

(1) A mobile apparatus for monitoring state of cosmetic items in a drawer or on a shelf. The apparatus includes a camera, a display device, and processing circuitry. The processing circuitry is configured to capture an image of the drawer and its contents using the camera, decode the captured image to identify cosmetic items as the contents contained in the drawer and respective location of the identified cosmetic items, and display on the display device a notification of identified cosmetic items that have expired.

(2) The mobile apparatus of feature (1), in which the camera adjusts a size of the captured image based on corners of the drawer or shelf to substantially match dimensions of a display screen of the display device.

(3) The mobile apparatus of features (1) or (2), in which the processing circuitry decodes the captured image by performing image analysis to extract a shape of the cosmetic items.

(4) The mobile apparatus of feature (3), in which the processing circuitry matches the shape of the cosmetic items with a database that stores shapes and related identification information in order to identify the cosmetic items.

(5) The mobile apparatus of feature (4), in which the database stores an initial storage date and an expiration date of the cosmetic items, and the processing circuitry uses the identification information of a cosmetic item to retrieve the initial storage date and the expiration date from the database and uses the initial storage date and the expiration date to check if the cosmetic item has expired.

(6) The mobile apparatus of feature (5), in which the processing circuitry performs an image augmented reality process that augments the captured image of the drawer and its contents with highlighting around a border of a cosmetic item in which the check indicates that the cosmetic item has expired, and the processing circuitry displays on the display device the augmented captured image as the notification of identified cosmetic items that have expired.

(7) The mobile apparatus of feature (6), in which the processing circuitry displays the highlighting around the border of the cosmetic item in the augmented captured image as a periodically flashing backlight.

(8) An augmented reality system for indicating status of cosmetic items in a drawer or on a shelf. The system includes a mobile device having a mobile display, a camera, and processing circuitry, and an augmented reality display device. The processing circuitry is configured to capture an image of the drawer and its contents, recognize cosmetic items contained in the drawer, analyze the recognized cosmetic items for compatibility and freshness degree, and the augmented reality display device highlighting a group of cosmetic items determined to be compatible and within the freshness degree.

(9) The augmented reality system of feature (8), in which the processing circuitry recognizes cosmetic items performing image analysis on the captured image to extract the shape of the cosmetic items.

(10) The augmented reality system of feature (9), in which the processing circuitry matches the shape of the cosmetic items with a database that stores shapes and related identification information in order to identify the cosmetic items.

(11) The augmented reality system of feature (10), in which the processing circuitry stores a look-up table of cosmetic items that are compatible with other cosmetic items.

(12) The augmented reality system of feature (11), in which the processing circuitry selects a cosmetic item from the database, and retrieves from the look-up table cosmetic items that are compatible with the selected cosmetic item.

(13) The augmented reality system of feature (12), in which the processing circuitry performs an image augmented reality process that augments the captured image of the drawer and its contents with highlighting around a border of the selected cosmetic item and around the border of the cosmetic items that are compatible, and the processing circuitry displays on the display device the augmented captured image including the highlighted selected cosmetic item and the highlighted compatible cosmetic items.

(14) The augmented reality system of feature (13), in which the processing circuitry displays the highlighting around the border of the selected cosmetic item in a color and the highlighting around the border of the compatible cosmetic items with the same color.

(15) An augmented reality system for guiding application of cosmetic items in a drawer or on a shelf. The system includes a mobile device having a mobile display, a camera, and processing circuitry, and an augmented reality display device. The processing circuitry is configured to display on the mobile display a notification of a cosmetic item to apply, highlight the cosmetic item in the augmented reality display device, and record in a database usage information of the cosmetic item.

(16) The augmented reality system of feature (15), in which the processing circuitry displays the notification including an image of the cosmetic item to apply and instructions for applying the cosmetic item.

(17) The augmented reality system of features (15) or (16), further including the processing circuitry displaying in the augmented reality display device the drawer and its contents, augmented with the highlight around a border of the cosmetic item to apply as listed in the display on the mobile display.

(18) The augmented reality system of feature (16), in which the processing circuitry retrieves the image of the cosmetic item from a database of a cloud service.

(19) The augmented reality system of any of features (15) to (18), in which the processing circuitry captures an image of the drawer and its contents using the camera, and decodes the captured image to identify the cosmetic items contained in the drawer and respective location of the identified cosmetic items.

(20) The augmented reality system of feature (19), in which the processing circuitry displays on the augmented reality display device the highlight around a border of the cosmetic item based on the respective location of the cosmetic item.

Numerous modifications and variations of the present invention are possible in light of the above teachings. It is therefore to be understood that within the scope of the appended claims, the invention may be practiced otherwise than as specifically described herein.

The invention claimed is:

1. A mobile apparatus for monitoring state of cosmetic items in a drawer or on a shelf, the apparatus comprising:
a camera;
a display device; and
processing circuitry,
wherein the processing circuitry is configured to
capture an image of the drawer or the shelf and its contents using the camera,
decode the captured image to identify cosmetic items as the contents contained in the drawer or the shelf, respective location of the identified cosmetic items, and identification information of the identified cosmetic items, and
display on the display device a notification of the identified cosmetic items that have expired, wherein if the identification information does not include an expiration date for the cosmetic item, the expiration is estimated based on an initial storage date that a cosmetic item has been placed in the drawer or the shelf.

2. The mobile apparatus of claim 1, wherein the camera adjusts a size of the captured image based on corners of the drawer or shelf to substantially match dimensions of a display screen of the display device.

3. The mobile apparatus of claim 1, wherein the processing circuitry decodes the captured image by performing image analysis to extract a shape of the cosmetic items.

4. The mobile apparatus of claim 3, wherein the processing circuitry matches the shape of the cosmetic items with a database that stores shapes and related identification information in order to identify the cosmetic items.

5. The mobile apparatus of claim 4, wherein the database stores the initial storage date and the expiration date of the cosmetic items, and
wherein the processing circuitry uses the identification information of a cosmetic item to retrieve the initial storage date and the expiration date from the database and uses the initial storage date and the expiration date to check if the cosmetic item has expired.

6. The mobile apparatus of claim 5, wherein the processing circuitry performs an image augmented reality process that augments the captured image of the drawer and its contents with highlighting around a border of a cosmetic item in which the check indicates that the cosmetic item has expired, and wherein the processing circuitry displays on the display device the augmented captured image as the notification of identified cosmetic items that have expired.

7. The mobile apparatus of claim 6, wherein the processing circuitry displays the highlighting around the border of the cosmetic item in the augmented captured image as a periodically flashing backlight.

8. An augmented reality system for indicating status of cosmetic items in a drawer or on a shelf, the system comprising:
   a mobile device having a mobile display, a camera, and processing circuitry; and
   an augmented reality display device,
   the processing circuitry is configured to
   capture an image of the drawer and its contents,
   recognize cosmetic items contained in the drawer,
   analyze the recognized cosmetic items for freshness degree, and
   the augmented reality display device highlighting a group of cosmetic items determined to have a similar freshness degree, wherein dates of the cosmetic items that are within a predetermined time duration are considered as having the similar freshness degree.

9. The augmented reality system of claim 8, wherein the processing circuitry recognizes cosmetic items performing image analysis on the captured image to extract the shape of the cosmetic items.

10. The augmented reality system of claim 9, wherein the processing circuitry matches the shape of the cosmetic items with a database that stores shapes and related identification information in order to identify the cosmetic items.

11. The augmented reality system of claim 10, wherein the processing circuitry stores a look-up table of cosmetic items that are compatible with other cosmetic items.

12. The augmented reality system of claim 11, wherein the processing circuitry selects a cosmetic item from the database, and retrieves from the look-up table cosmetic items that are compatible with the selected cosmetic item.

13. The augmented reality system of claim 12, wherein the processing circuitry performs an image augmented reality process that augments the captured image of the drawer and its contents with highlighting around a border of the selected cosmetic item and around the border of the cosmetic items that are compatible, and
   wherein the processing circuitry displays on the display device the augmented captured image including the highlighted selected cosmetic item and the highlighted compatible cosmetic items.

14. The augmented reality system of claim 13, wherein the processing circuitry displays the highlighting around the border of the selected cosmetic item in a color and the highlighting around the border of the compatible cosmetic items with the same color.

15. An augmented reality system for guiding application of cosmetic items in a drawer or on a shelf for a cosmetic application, the system comprising:
   a mobile device having a mobile display, a camera, and processing circuitry; and
   an augmented reality display device,
   the processing circuitry is configured to
   display on the mobile display a notification of a cosmetic item according to a sequence of application of the cosmetic items to apply for the cosmetic application,
   highlight the cosmetic item in the augmented reality display device, and
   record in a database usage information of the cosmetic item in order to track the number of times and quantity of usage of the cosmetic item.

16. The augmented reality system of claim 15, wherein the processing circuitry displays the notification including an image of the cosmetic item to apply and instructions for applying the cosmetic item.

17. The augmented reality system of claim 16, wherein the processing circuitry retrieves the image of the cosmetic item from a database of a cloud service.

18. The augmented reality system of claim 15, further comprising:
   the processing circuitry displaying in the augmented reality display device the drawer and its contents, augmented with the highlight around a border of the cosmetic item to apply as listed in the display on the mobile display.

19. The augmented reality system of claim 15, wherein the processing circuitry captures an image of the drawer and its contents using the camera, and decodes the captured image to identify the cosmetic items contained in the drawer and respective location of the identified cosmetic items.

20. The augmented reality system of claim 19, wherein the processing circuitry displays on the augmented reality display device the highlight around a border of the cosmetic item based on the respective location of the cosmetic item.

* * * * *